United States Patent [19]

Gohm et al.

[11] 4,395,780

[45] Jul. 26, 1983

[54] SERVICE-INTEGRATED COMMUNICATION TRANSMISSION AND EXCHANGE SYSTEM

[75] Inventors: Lothar Gohm; Klaus Krull, both of Weissach, Fed. Rep. of Germany

[73] Assignee: Licentia Patent-Verwaltungs-GmbH, Frankfurt am Main, Fed. Rep. of Germany

[21] Appl. No.: 275,047

[22] Filed: Jun. 18, 1981

[30] Foreign Application Priority Data

Jun. 18, 1980 [DE] Fed. Rep. of Germany ....... 3022725

[51] Int. Cl.³ .......................... H04N 7/18; H04B 9/00
[52] U.S. Cl. ...................................... 455/607; 358/86; 358/257; 370/1; 455/5; 455/601
[58] Field of Search ............................ 358/257, 84, 86; 455/607, 601, 3, 5; 370/1

[56] References Cited

U.S. PATENT DOCUMENTS

| | | | |
|---|---|---|---|
| 3,919,462 | 11/1975 | Hartung et al. | 455/4 |
| 3,934,079 | 1/1976 | Barnhart | 455/4 |
| 4,090,220 | 5/1978 | Gargini | 358/86 |
| 4,135,202 | 1/1979 | Cutler | 358/86 |

OTHER PUBLICATIONS

Manabu Sunazawa et al., "Low Power CML IC Crosspoint Switch Matrix for Space Division Digital Switching Networks" I.E.E.E. Journal of Solid State Circuits, vol. SC-10, No. 2, 4/75.

Elmer H. Hara "Conceptual Design of a Switched Television Distribution System Using Optical-Fiber Waveguides", I.E.E.E. Transactions on Cable Television, vol. CATV.-2 No. 3, 7/1977, pp. 120-130.

Primary Examiner—Robert L. Griffin
Assistant Examiner—Edward L. Coles
Attorney, Agent, or Firm—Spencer & Kaye

[57] ABSTRACT

A service-integrated communication transmission and exchange or relay system for audio, video and data services, of the type including a central exchange or relay office and a plurality of user equipment connected thereto by means of optical fibre cables, and wherein the user equipment are equipped with selection and receiving devices for selecting and receiving certain services and their programs which are transmitted over possibly likewise selectable transmission channels. An acknowledgment arrangement is provided with which the selection and relaying of the services by the central office can be acknowledged to the user equipment.

6 Claims, 4 Drawing Figures

SERVICE-INTEGRATED COMMUNICATION TRANSMISSION AND EXCHANGE SYSTEM

BACKGROUND OF THE INVENTION

The present invention relates to a service-integrated communication transmission and exchange or relay system for audio, video and data services wherein the system includes a relay or exchange device or arrangement at a central exchange or relay station and a plurality of user equipment connected to the central station by means of optical fibre cables and associated optical transmitters and receivers, and with the user equipment being equipped with selection and receiving devices for selecting and receiving certain services and/or their programs which are transmitted by the exchange stations over possibly likewise selectable transmission channels.

A system of the above-described type is disclosed in German Offenlegungsschrift (laid open application) No. DE-OS 2,900,813. The drawback of this system is that if there is an error in the transmission of the selection signals or in the relay or exchange equipment, the transmitted program is not what the user selected. The user might not be able to determine immediately the coincidence (or noncoincidence) between the selected and the delivered program, particularly if radio programs are involved.

SUMMARY OF THE INVENTION

It was, therefore, the object of the present invention to provide a system of the above-mentioned type in which the user, after completion of the selection of a program, can recognize at once whether the program transmitted by the exchange station and received by the user coincides with the selected program.

It is a further object of the present invention to provide such a system which is as inexpensive as possible.

The above objects are achieved according to the present invention in that in a service-integrated communication transmission and exchange or relay system for audio, video and data services of the type including a central exchange station for supplying selected services and a plurality of user equipment which are connected to the central exchange station by means of optical fibre cables and associated optical transmitters and receivers, and which are equipped with means for transmitting a selection signal to the exchange station to select certain desired services and their programs to be transmitted by the exchange station over likewise selectable transmission channels and for receiving the transmitted programs; the exchange station further includes an acknowledgment circuit means for producing a signal acknowledging receipt of a selection signal from a user equipment and means for transmitting the acknowledging signal to the associated user equipment; and the user equipment includes means for receiving the acknowledgment signal.

According to further features of the invention, the acknowledgment signal includes the identification number of the selected service, the identification number of the program and the identification number of the transmission channel utilized; the acknowledgment signal and the selection signal preferably coincide in signal form, type of modulation and code; and the acknowledgment signal preferably is combined with the signals of the selected program being transmitted by the exchange station and is demodulated or decoded and displayed on a display device at the user equipment.

According to the preferred embodiment of the invention, the acknowledgment signal is produced by keying in or out of a carrier frequency, which is outside of the signal frequency range of the selectable services, according to a code representing the acknowledgment signal being transmitted, and the code is provided by a separate memory located in the exchange station for each of the services, programs, and transmission channels. Preferably, each memory is a clock pulse actuated shift register whose output is connected to one input of a linkage member whose other input is connected to receive the carrier frequency, and whose output is connectable to the selected transmission channel.

The present invention makes it possible for a user to determine, immediately after selecting a program, whether the received program coincides with the selected or desired program. If there is noncoincidence, which may have been caused, for example, by an error in the transmission of the selection signals or by errors within the relay or exchange equipment, the user is able to at once reselect the desired program. Thus, the solution of the present invention saves the user much annoyance if he determines only after a long period of time that he has listened to or watched the wrong program.

It should be noted that it is possible with the solution according to the present invention, by the use of a comparator and of an automatic selection repeater, to further increase the ease of use, in that the user need state the desired selection only once. Moreover, if a microprocessor which is capable of accepting time-dependent program selections is additionally used, it is possible to use video or audio memories for the automatic reception of certain broadcasts preselected by the user so that, even if there are errors in the transmission of the selection signals or errors in the relay equipment, the correct information for the desired broadcast is stored. This feature remains in effect even with serious interferences in the transmission, if the microprocessor is given a sufficiently long lead time before the start of the actual broadcast so that in the case of an error, a number of repetitions can be made. This will make it possible with a sufficiently high probability to provide the correct station for the user in time for the start of the respective selected program broadcast.

DETAILED DESCRIPTION OF THE PREFERRED EMBODIMENTS

Figure 1:
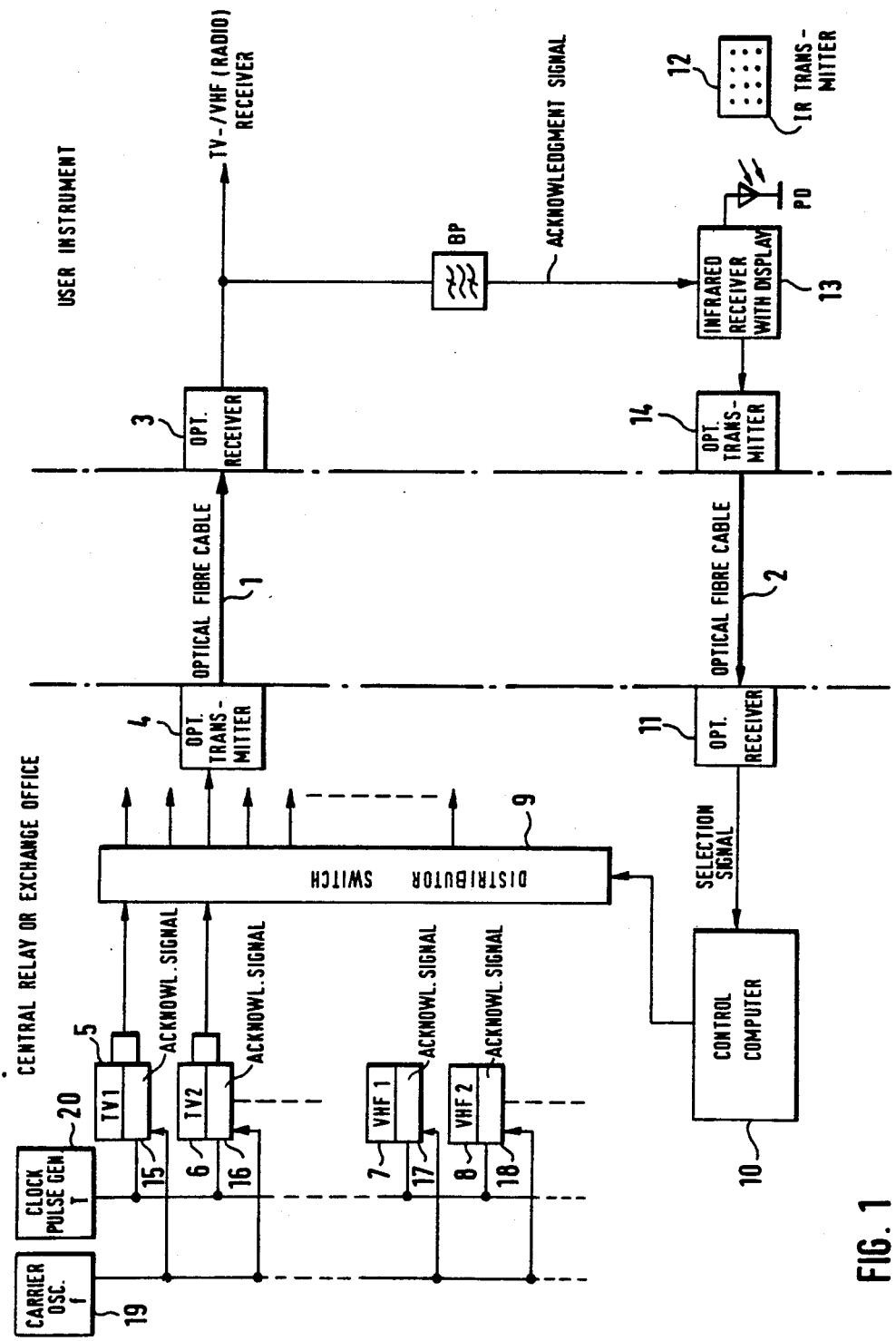
FIG. 1 is a block circuit diagram for the entire system according to one embodiment of the invention.

Referring now to FIG. 1, the entire system is shown in block diagram form with the left side of FIG. 1 illustrating the portion of the central exchange or relay office or center and the right side illustrating a portion of a user equipment. The central relay or exchange station and the user instrument are connected together by means of two optical fibre cables 1 and 2, one for each transmission direction. In the illustrated embodiment, it is assumed that the user equipment includes television and VHF (radio) receivers which are connected, via an optical receiver 3 located in the user equipment, through the optical fibre cable 1 and, via an optical transmitter 4 in the central office, with that central office.

The central office, as shown, also includes television and VHF radio services although it is to be understood that other type of data and radio services may be provided as well. The central office includes a plurality of television signal transmitters 5, 6, etc., one for each selectable television channel or program, and a plurality of VHF radio signal transmitters 7, 8, etc., one for each selectable radio station or program. The signal outputs of each of the signal transmitters, e.g., 5–8, are connected to respective inputs of a relay or distributor switch 9, having a plurality of outputs corresponding to the selectable transmission channels existing between the central station of the various user equipment. The switching of the distributor switch 9 is controlled by a conventional control computer 10, which in turn is responsive to a service and/or program selection signal received from a user equipment via the optical fibre calbe 2 and the optical receiver 11.

A type of switch suitable for the distributor switch 9 is described in IEEE Journel of Solid-State Circuits, Vol. SC-10, No. 2, April 1975, pages 117–122; a type of computer suitable for the control computer 10 is described in U.S. Pat. No. 4,090,220, issued May 16, 1978; and circuits of both of the above types are described in an article by Bruno Beuss et al. in Nachrichten Der Telefonbau Und Normalzeit (1980) No. 82.

At the user equipment, the (remote) control device of a television receiver may be used to call up or select the services and/or their programs or (stations). In the embodiment of the invention shown in FIG. 1, a selection keyboard with infrared transmitter 12 is used as the selection device. The infrared selection pulses produced by the transmitter 12 are fed to a photodiode PD which is connected to an infrared receiver 13 with series-connected converter. The converted selection pulses are then used to modulate a carrier frequency which is then fed to an optical transmitter 14 which is connected, via the return optical fibre cable 2 and the optical receiver 11 with the control computer 10 of the central office. The control computer 10 decodes the demodulated selection pulses according to service number, station or program number and number of the transmission channel. According to the contents of the received message, i.e., the selected signal, the control computer 10 controls the distribution of a relay switch 9 of the central office so as to switch the selected program or station, e.g., TV program 1 from signal transmitter 5, to the optical transmitter, e.g., optical transmitter 4, of the selected transmission channel so that the selected program can be transmitted to the selecting user via the first optical fibre cable 1.

According to the present invention, each of the signal transmitters 5–8 at the central office is provided with a separate acknowledgement device 15–18, respectively, which produces an associated acknowledgment signal. This acknowledgment signal is then mixed with the associated program signal for joint transmission to the user equipment. In the preferred embodiment of the invention, the acknowledgment signal comprises a keyed carrier of frequency f, which lies outside the program signal frequency and which is supplied by an oscillator 19. The carrier frequency f is keyed in or out at the clock pulse rate T supplied by the generator 20 according to the contents of a shift register acknowledgment memory. Via the switch 9 and the associated optical transmitter, e.g., 4, the acknowledgment signal, together with the program signal, reaches the user equipment where the acknowledgment signal is filtered out of the combined received signal by means of a bandpass filter BP, and is then demodulated, converted and displayed in the unit 13.

Figure 2:
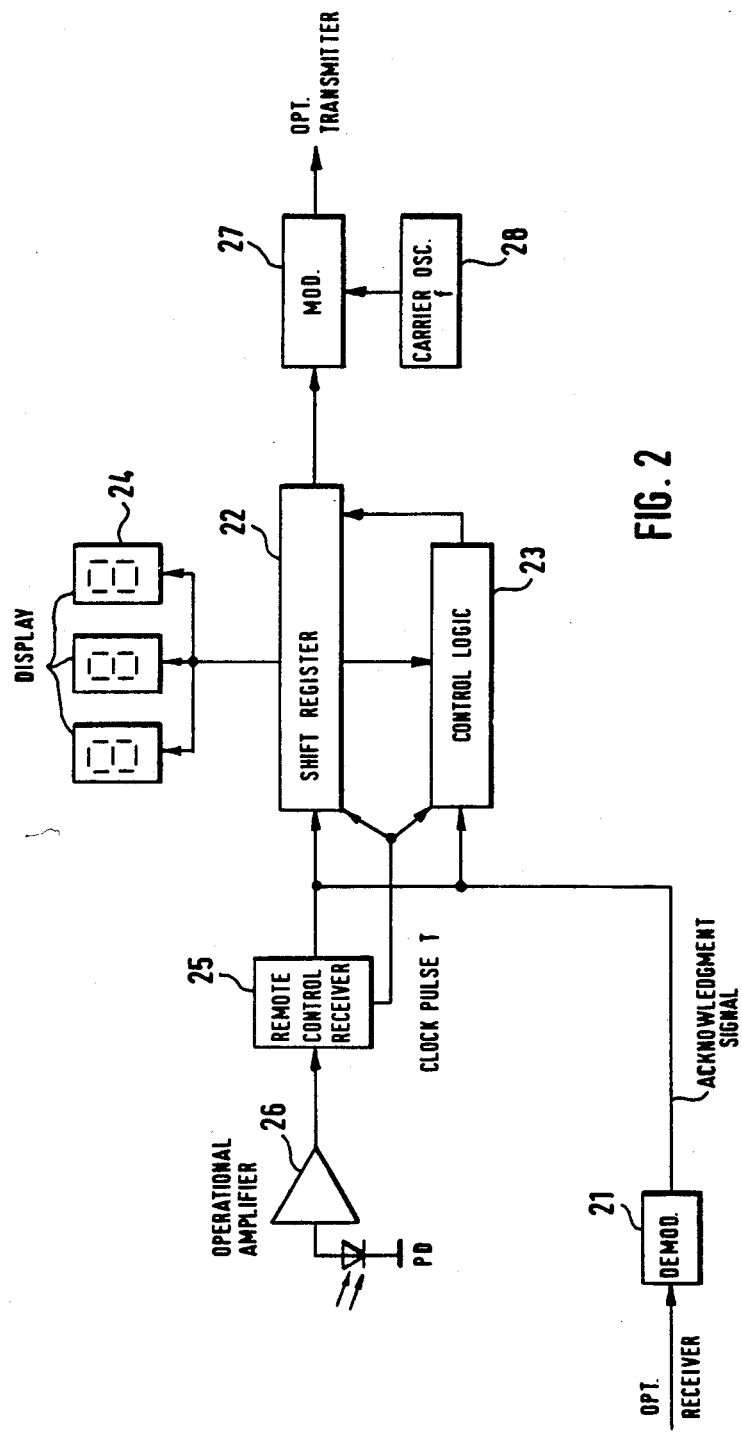
FIG. 2 is a more detailed block circuit diagram of the acknowledgment circuit in the user equipment shown generally in FIG. 1 and in the central office.

FIG. 2 shows the details of the acknowledgment device of the user equipment and, in particular, the unit 13 of FIG. 1. As shown, the acknowledgment signal, filtered out of the combined signal appearing at the output of the optical receiver 3, is fed to a demodulator 21 and then to a shift register 22. In the shift register 22, the acknowledgment signal is shifted, with the aid of a control logic circuit 23 to the correct memory locations so that it can be displayed on a display device 24. FIG. 2 further shows the remote control receiver module 25, which may, for example, be a module Number U336M, manufactured by aeg-telefunken, as well as the operational amplifier module 26, which amplifies the signals received from the photodiode PD, and which may, for example, be an operational amplifier module Number U250B manufactured by aeg-telefunken.

By means of the remote control receiver 25, the selection signals which have the same code as the acknowledgment signals can also reach the shift register 22 from where they are shifted, by means of the control logic circuit 23 to a modulator 27 where they are used to modulate a carrier signal of frequency f supplied by an oscillator 28. The modulated carrier signal, which forms the selection signal for the system, is then fed to the associated optical transmitter, e.g., the transmitter 14, for transmission to the central office.

Figure 3:
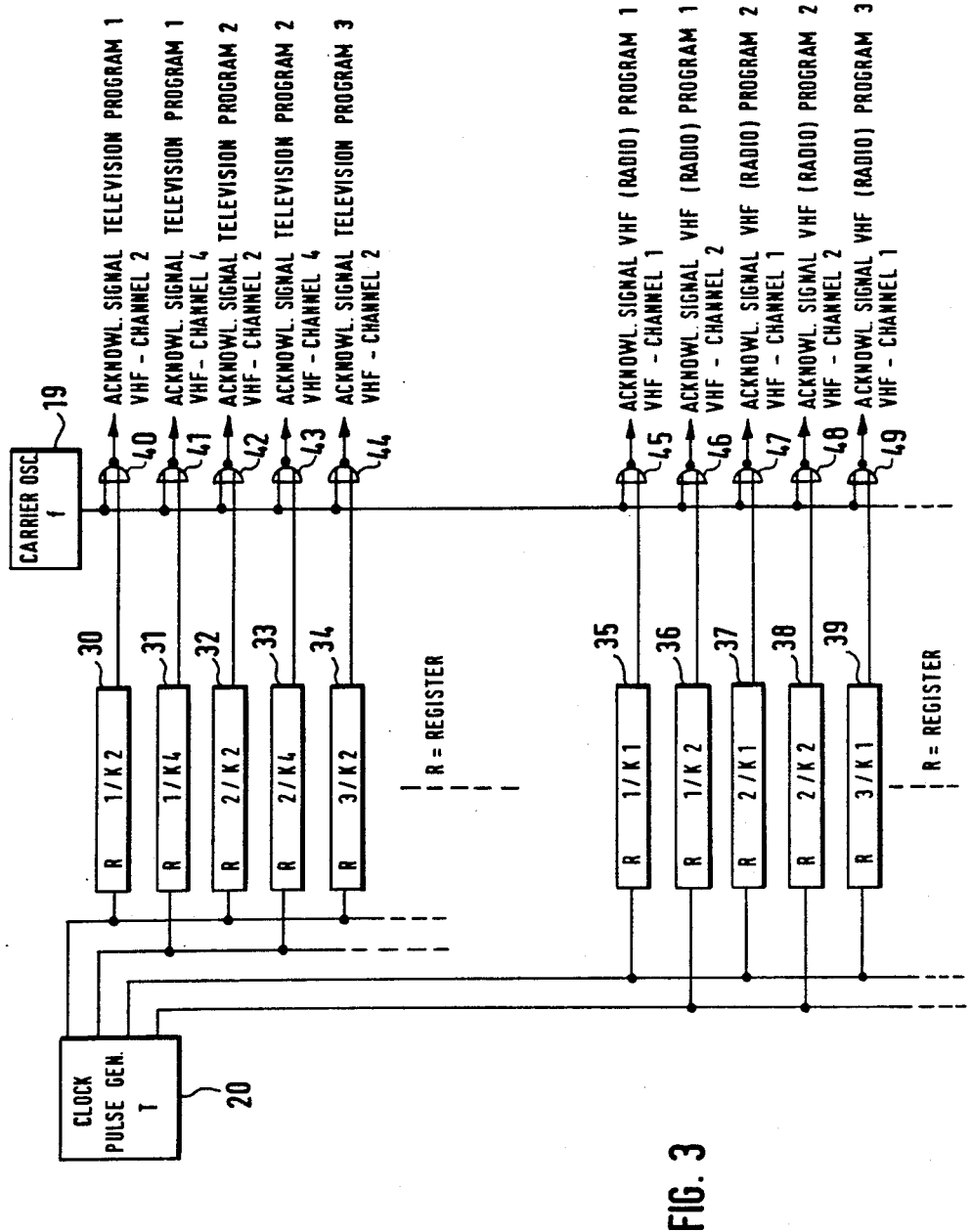
FIG. 3 is a more detailed block circuit diagram of the acknowledgment circuit in the central exchange office shown generally in FIG. 1.

FIG. 3 shows further details of the acknowledgment circuit arrangement at the central office end. On the left side, a plurality of shift registers 30–39 are arranged one above the other in two groups, with the upper group of shift registers 30–34 being assigned to the television service and the lower group of shift registers 35–39 being assigned to the VHF (radio) service. Each one of these registers 30–39 is associated with one program and one of the total of four available transmission channels K1 through K4 and permanently contains a corresponding acknowledgment identification. The outputs of these shift registers, which are charged with a shifting clock pulse T from the clock pulse generator 20, are each connected to one input of an associated NOR linkage member 40–49 whose other input is connected to the carrier oscillator 19 furnishing the carrier frequency f. The outputs of the NOR linkage members 40–49 each furnish the acknowledgment signal assigned to the individual program of the services and to the transmission channel, which acknowledgment signal is mixed into the program signal.

Advantageously, a block of 14 bits is used for the format of both the acknowledgment and selection signals, with the bits having the following meaning:
bit 1: first preamble bit;
bits 2 to 5: binary coded first number which corresponds to the tens position of the number of the selected program;
bit 6: transmission channel number (which may be associated, for example, with a room in the user's residence);
bit 7: service;

bit 8: second preamble bit;

bits 9 through 12: binary coded second number which corresponds to the unit position of the number of the selected program;

bit 13: transmission channel number; (see bit 6)

bit 14: service;

the preamble bit set at binary 1 representing the start of each instruction word.

If, as in the illustrated embodiment of the invention, the user has several receivers which are simultaneously operated over the here maximum four available transmission channels, the selection or acknowledgment signals are advantageously transmitted sequentially in time.

As should be generally known, only one remote control infrared receiver can be operated within one room at the user's residence since otherwise the reflections of the infrared signals at the walls, etc. would lead to faulty reception. If now, for example, a television receiver and a radio receiver are located in the same room, which are each provided with remote control devices, and if the acknowledgment device, according to the present invention, has only one common acknowledgment display, the last selected service with associated program number is advantageously displayed. If, during simultaneous operation of the television and the radio receiver, it is desired to have the station of the first-selected service displayed, this is possible in the remote control transmitter by means of an appropriate key input, i.e., "television"or "radio," respectively, since both acknowledgment signal can be stored.

In the embodiment of the invention shown in FIG. 1 or 2, the selection signal which is to be transmitted to the central office can also be indicated on the display 24. The user can easily recognize a possible difference in the acknowledgment signal displayed after connection of the program.

By actuation of the "Off" key on the remote control device, the display can be switched off. Renewed actuation of the display is initiated by actuation of the key corresponding to the first programmer station number.

Advantageously, a three-characters display is sufficient, so that, for example, the display U05 could represent VHF radio program No. 5 while a display of F06 could represent television program or channel 6. It is, of course, also possible to realize a longer display so that a particular room or transmission channel-identifying number can be additionally displayed. A dual display is also conceivable, where each display is fixedly assigned to a particular receiver.

Figure 4:
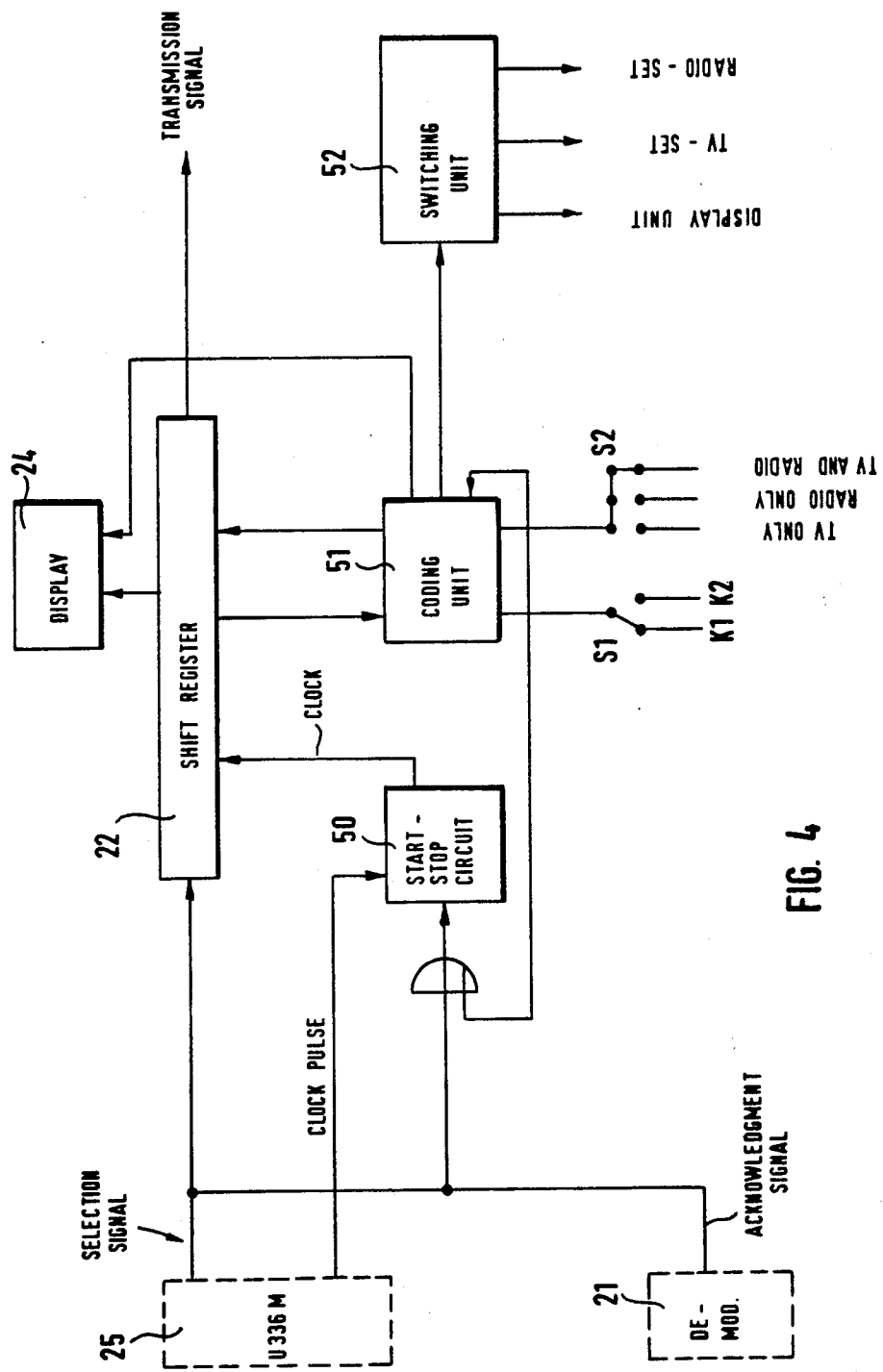
FIG. 4 is a detailed block circuit diagram of the user subscriber equipment.

FIG. 4 shows the shift register 22 and the control logic 23 of FIG. 2 in more detail. The circuit has basically two functions, i.e. (1) storage, coding and transmitting of the selecting signals and (2) the storage and proofing of the acknowledgment signal.

If the selecting signal arrives at the entrance of the shift register 22, the preamble bit activates the start-stop circuit 50, so that at the output of this circuit a given number of clock pulses are delivered to the shift register 22. The clock pulses come from the control receiver 25 module U 336M) or from a separate clock oscillator. The given number of clock pulses is the same as the number of the information bits of the selection signal, which is shifted into the shift register 22 and encoded by means of the coding unit 51. A first task of this module is to proof the admissibility of the selection signal by comparing the operation mode given by the external switch S2 and the corresponding information of the selection signal. In the case of no coincidence, the content of shift register 22 is conceled. In the case of coincidence, the coding unit 51 inserts the transmission channel number K1 or K2, which is determined the position of by the external switch S1. Then the coding unit 51 causes the display 24 to show the number of the selected program and activates a switching unit 52 to switch on the power for the display, the TV set and/or radio set.

After receiving the selection signal containing the command "out" the power is switched off.

After insertion of the transmission channel number, the content of the shift register 22 is read out to the transmission line.

If the exchange office sends back the acknowledgment signal to the user equipment, the acknowledgment signal is shifted into the shift register 22 and compared, by the coding unit 51, with the information given by the switches S1 and S2. In the case of coincidence the program number is shown at the display 24, in the other case the content of the shift register 22 is conceled.

It will be understood that the above description of the present invention is susceptible to various modifications, changes and adaptations, and the same are intended to be comprehended within the meaning and range of equivalents of the appended claims:

What is claimed is:

1. In a service-integrated communication transmission and exchange system for audio, video and data services, said system including a central exchange station for supplying selected services and a plurality of user equipments connected to said central exchange station by means of optical fiber cables and associated optical transmitters and receivers, said user equipments being equipped with means for transmitting a selection signal to said exchange station to select certain desired services and their programs to be transmitted by said exchange station over likewise selectable transmission channels and for receiving the transmitted programs, the improvement wherein said exchange station further includes an acknowledgment means for producing a signal acknowledging receipt of a selection signal from a user equipment and means for transmitting the acknowledging signal to the associated user equipment; wherein said means for producing said acknowledgment signal comprises means for keying in or out a carrier frequency, which is outside of the signal frequency range of the selectable services, according to a code representing the acknowledgment signal being transmitted; wherein said means for transmitting said acknowledgment signal to said user equipment includes means for combining same with the signals of the selected program being transmitted by said exchange station; and wherein said user equipment includes means for receiving the transmitted acknowledgment signal including means for detecting the acknowledgment signal and displaying same on a display device.

2. A service-integrated communication transmission and exchange system as defined in claim 1, wherein said acknowledgment signal includes the identification number of the selected service, the identification number of the program and the identification number of the transmission channel utilized.

3. A service-integrated communication transmission and relay system as defined in claim 1 or claim 2 wherein said acknowledgment signal transmitted by said acknowledgment means and said selection signal transmitted by said selection signal transmitting means coincide in signal form, type of modulation and code.

4. A service-integrated communication transmission and exchange system as defined in claim 1 wherein said means for producing said acknowledgment signal in said exchange station includes a separate memory for each of the services; programs, and transmission channels with each said memory containing the respective identifying number, and circuit means for causing readout of the content of the associated memory upon receipt of a selection signal.

5. A service-integrated communication transmission and exchange system as defined in claim 4 wherein said memory is a clock pulse actuated shift register, and wherein said means for producing said acknowledgment signal further includes a linkage member having one input connected to the output of said shift register, its other input connected to receive said carrier frequency, and its output connectable to the selected transmission channel.

6. A service-integrated communication transmission and exchange system as defined in claim 4 or 5, wherein said means in said user equipment for detecting said acknowledgment signal includes a shift register whose parallel outputs are connected with the inputs of said display device, whose serial input is connected with the output of a service selection device and with the optical receiver of the associated optical fibre cable, and whose serial output is connected with the optical transmitter of the associated optical fibre cable.

* * * * *